ent Number: 4,854,548
Date of Patent: Aug. 8, 1989

[54] DECORATIVE POSTS FOR CROWD CONTROL

[76] Inventor: Glenn J. Wylie, 114 West Deane Park Drive, Islington, Ontario, Canada, M9B253

[21] Appl. No.: 854,445
[22] Filed: Apr. 21, 1986
[51] Int. Cl.⁴ .............................................. E04H 17/14
[52] U.S. Cl. ........................................ 256/65; 256/59; 403/191
[58] Field of Search ........................ 256/59, 65, 66, 72; 403/191

[56] References Cited

U.S. PATENT DOCUMENTS

| 3,506,243 | 4/1970 | Seiler | 256/59 |
| 4,014,520 | 3/1977 | Walters | 256/65 X |
| 4,361,314 | 11/1982 | Ohlson | 256/66 X |

FOREIGN PATENT DOCUMENTS 1556730 11/1979 United Kingdom .................. 256/65

*Primary Examiner*—Andrew V. Kundrat
*Attorney, Agent, or Firm*—Sheldon H. Parker

[57] ABSTRACT

A rail assembly is provided which includes a rail support bracket. The rail support bracket is an extruded member and has a rail receiving opening and a pair of legs. Each of the legs has a plurality of parallel locking wedge ridges transverse to the legs. The legs are capable of being received in a rail structure having locking wedge ridges at right angles to and positioned for engagement with the plurality of parallel, longitudinally extending, inwardly directed wedge shaped locking ridges. The assembly can also include first rail member and a second rail member, each having one end received in the rail receiving opening, and a wedge locking device. The wedge locking device has a first region force fit between an end of the first rail member and the bracket rail receiving opening and a second region force fit between one end of the second rail member and the bracket rail receiving opening. Through the force fit at least one of either the wedge locking device and/or the rail member is distorted, thereby locking rails in said bracket. In an additional embodiment the wedge locking device is an extruded plastic member and is distorted by the force between a rail and the bracket.

7 Claims, 11 Drawing Sheets

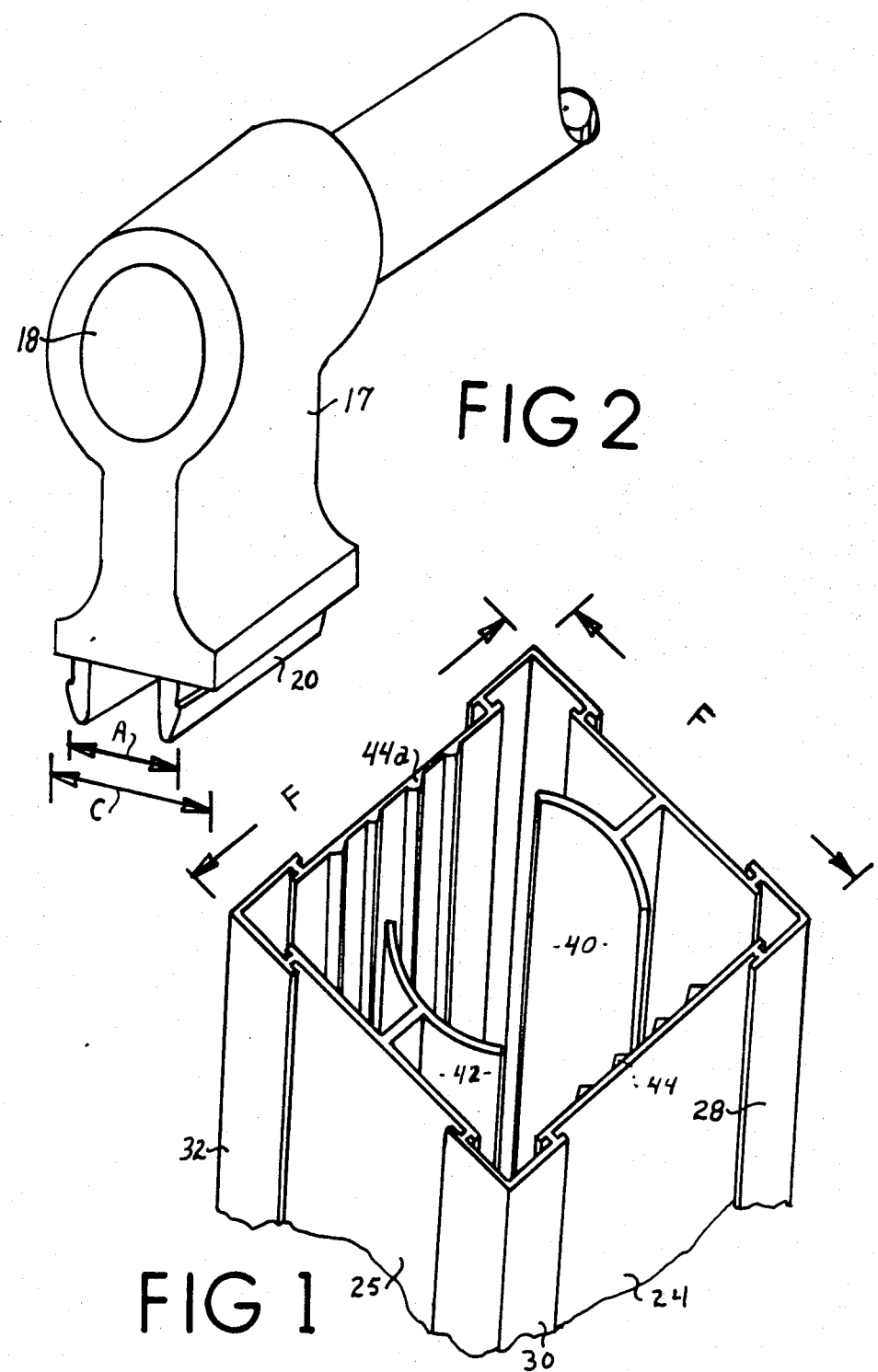

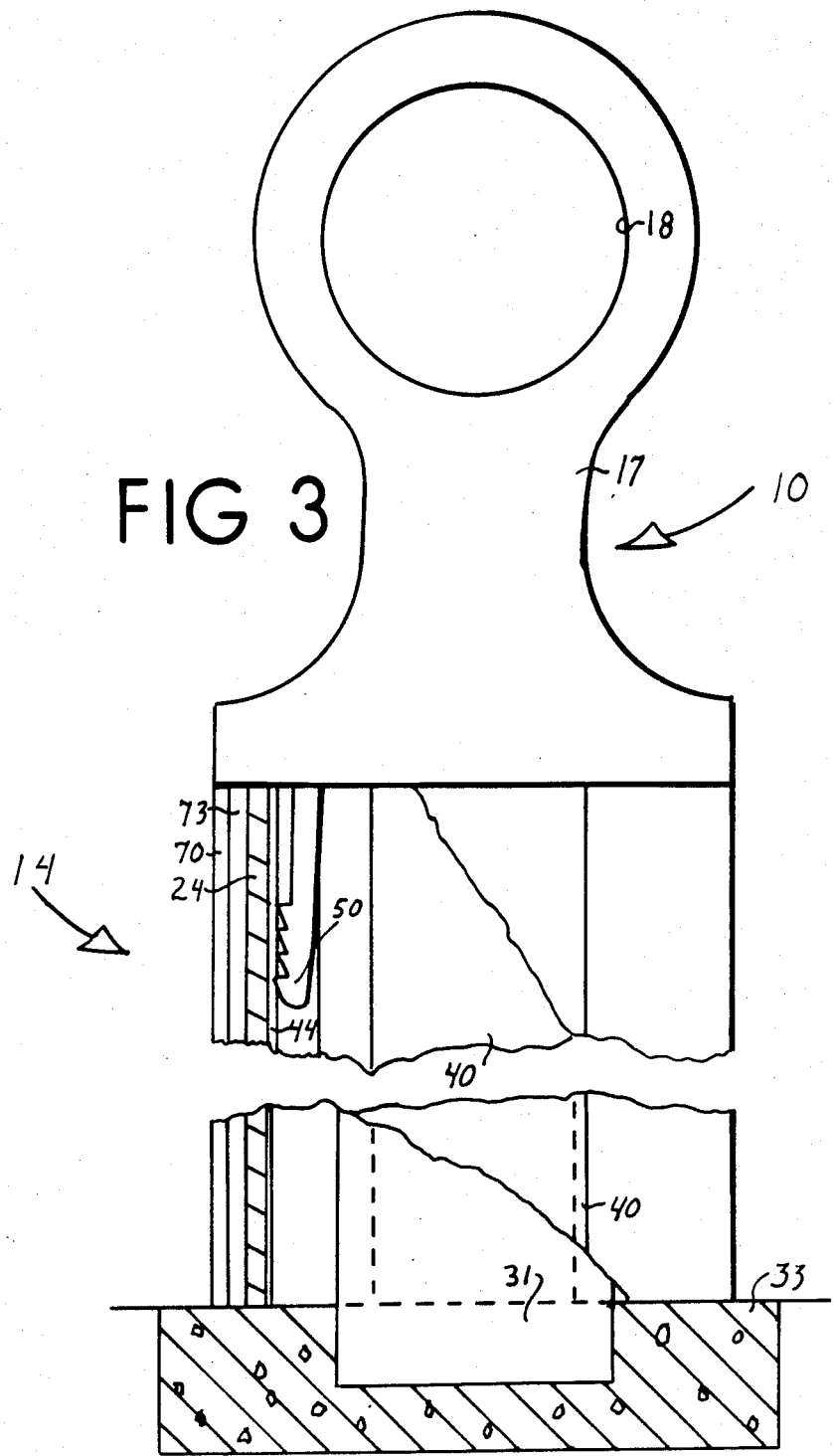

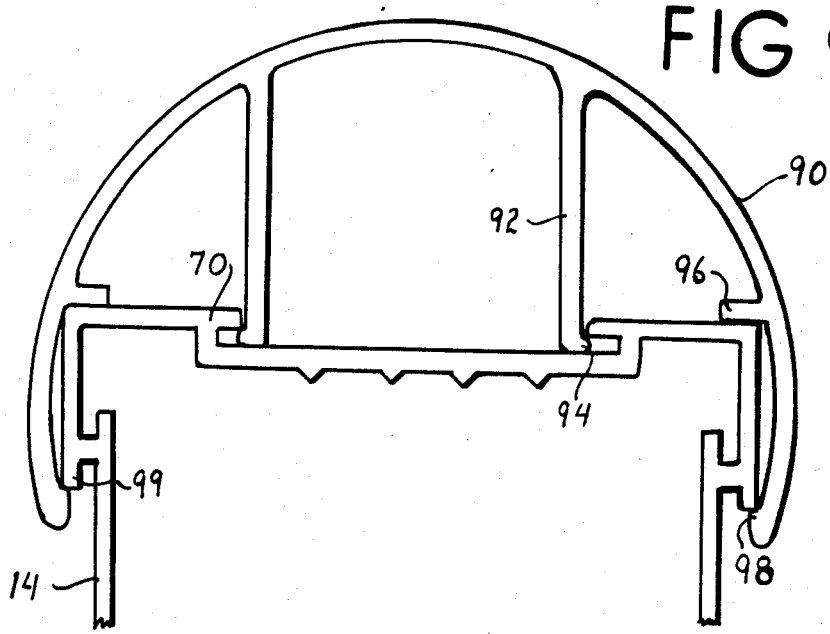
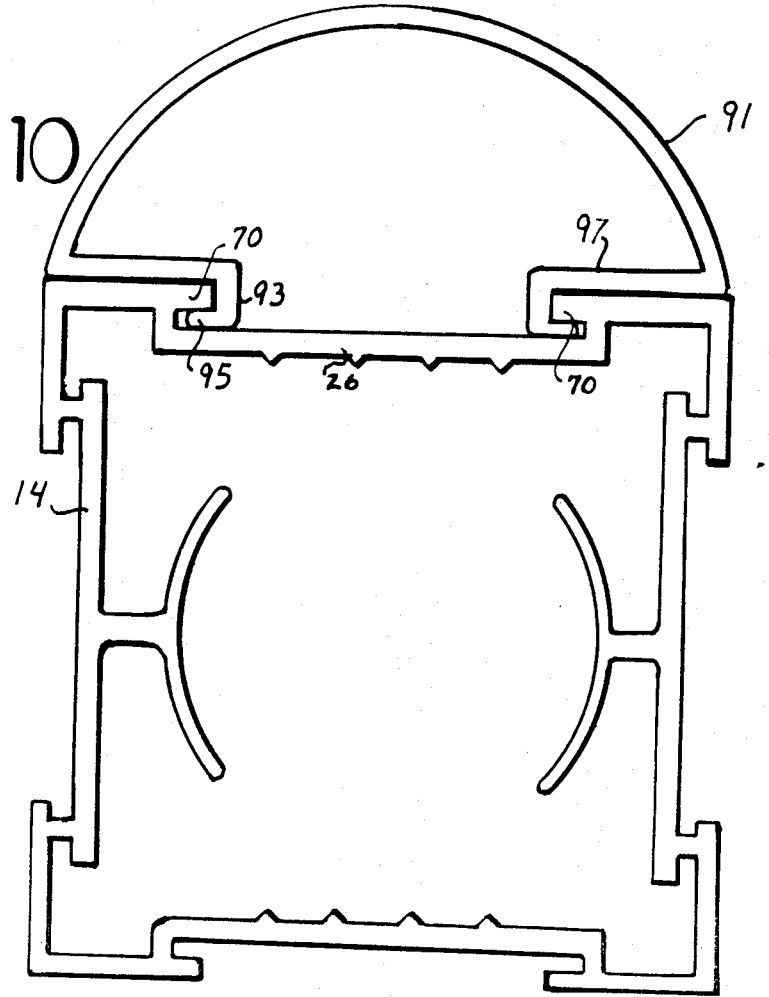

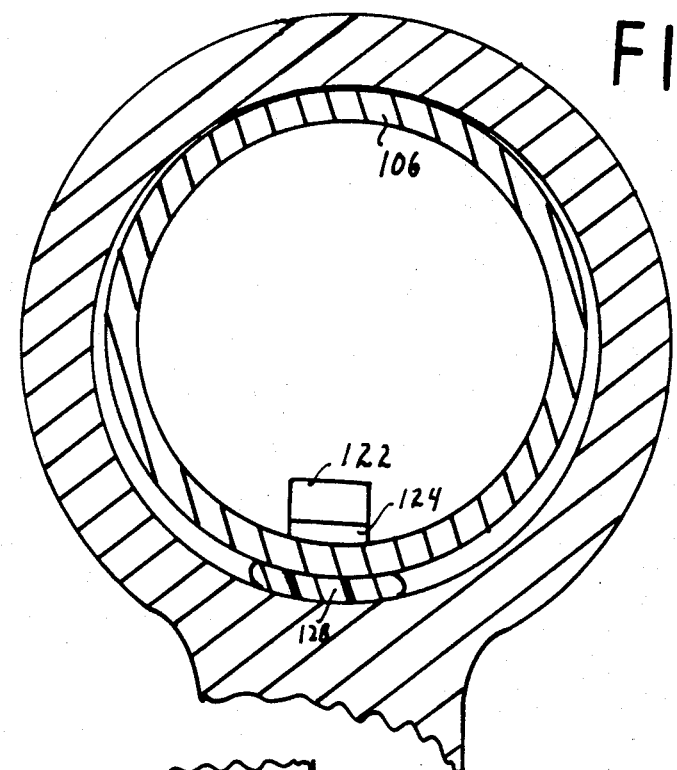
FIG 14
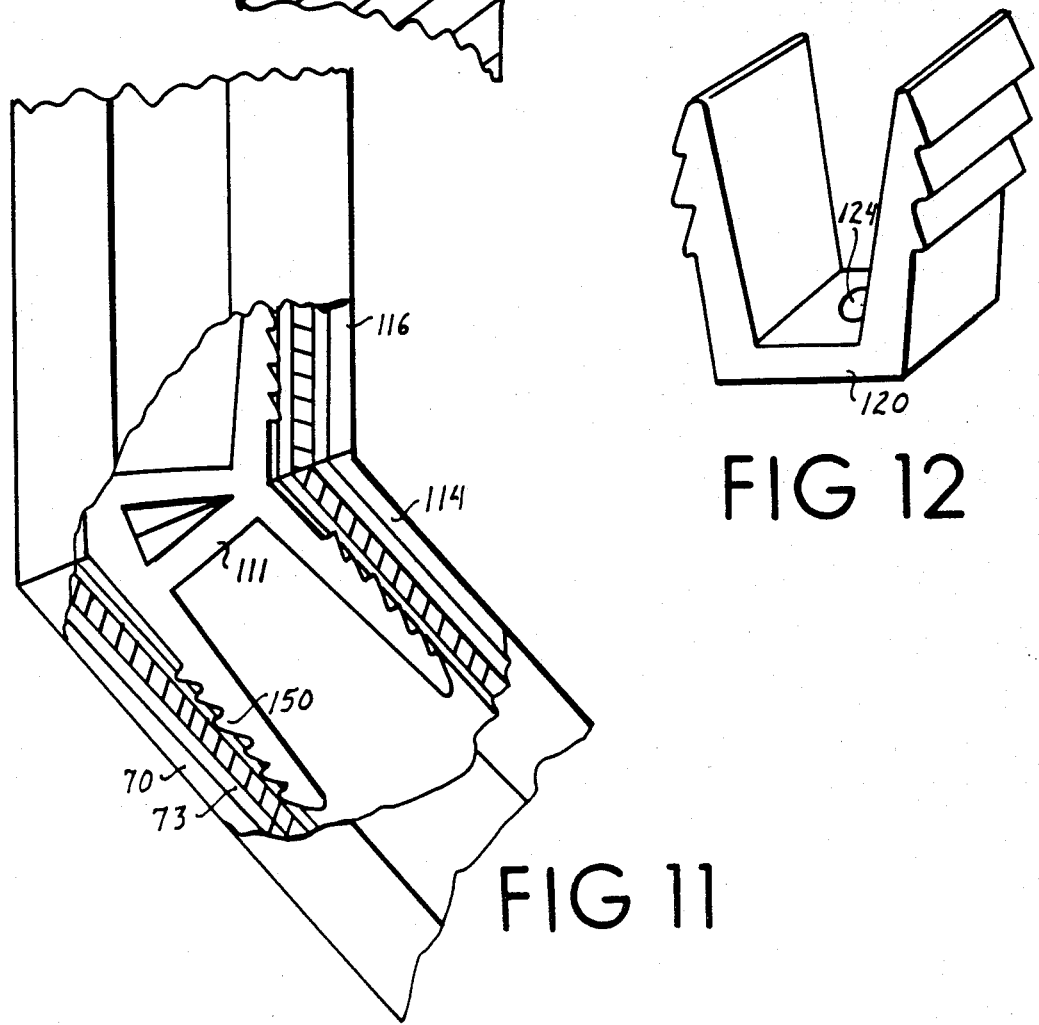
FIG 12
FIG 11

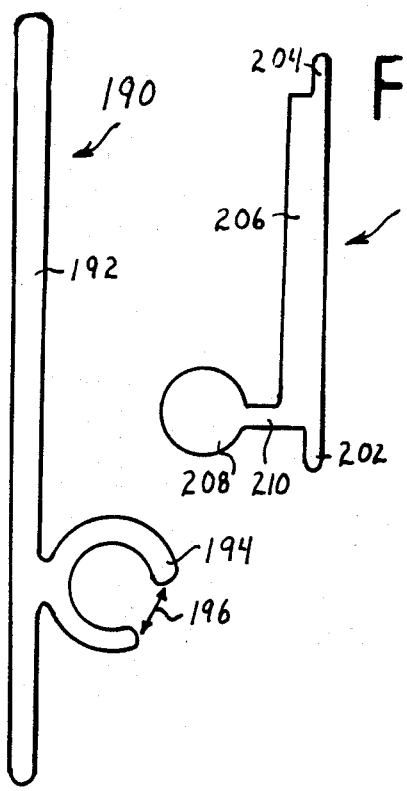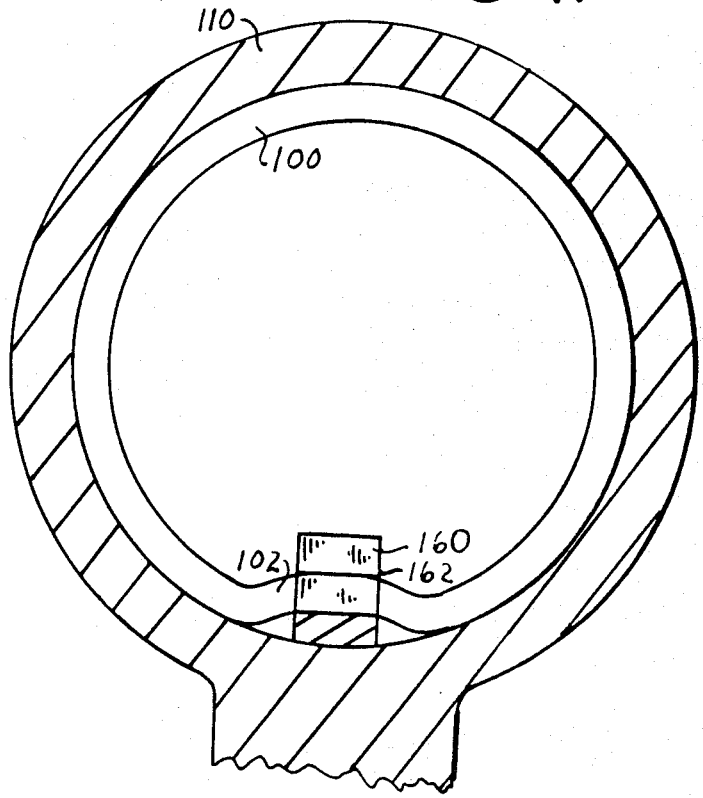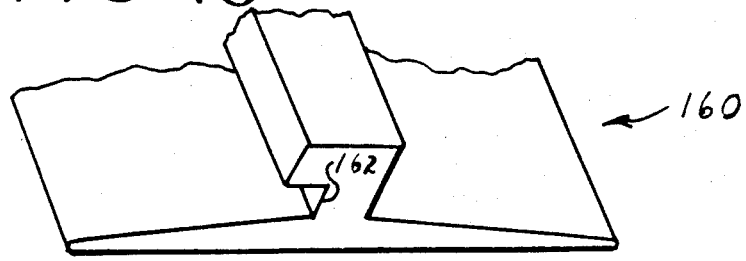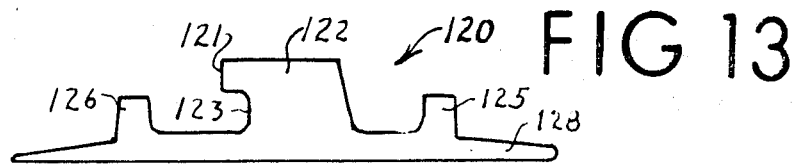

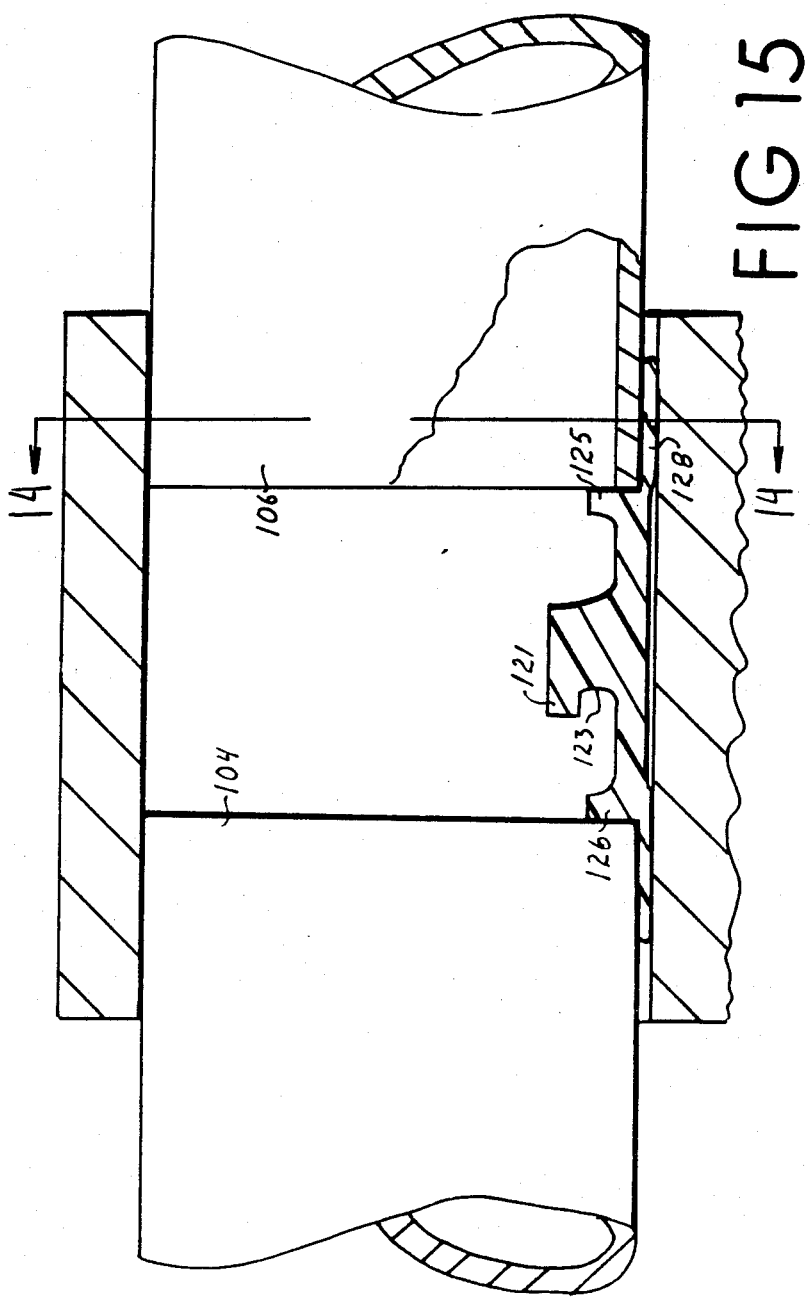

DECORATIVE POSTS FOR CROWD CONTROL

BACKGROUND OF THE INVENTION

1. Field of the Invention

This invention relates to railing systems and, more particularly, to extruded aluminum railing systems and components thereof for use in crowd control, stairwells, office furniture restaurant equipment and the like.

2. Brief Description of the Prior Art

For years posts and ropes have been used for directing and containing crowds in restaurants, banks etc. The posts are square or cylindrical with the standard end caps being balls or flat caps. Only a very limited number of decorative end caps are on the market, i.e. horse head or acorn. While it is apparent that it would be desirable to have a universal structure which could interchangeably be used in essentially unrelated applications, the prior art devices have failed to achieve the desired end result.

In U.S. Pat. No. 4,014,520, Walters discloses a rail assembly system which departs from the common used systems. In the patent is disclosed a locking mechanism, as illustrated in FIG. 16, in which a U-shaped capping member 100 is provided with stepped serations 102a which embed themselves in the angular ridges 91a on the inside wall of the element 90 when the wedge 108 is forced downwardly and the two walls 102 are driven apart. FIGS. 2 and 18 to 20 disclose top channel elements which can be used with the Walters rail system. One of the problems encountered with this type of element locking system is that when used with anodized aluminum, the pressure generated by the interlocking of parts results in sufficient metal distortion to produce a undesirable blemish on the surface of the rail.

In U.S. Pat. No. 3,918,686 to Knott et al, a railing system is disclosed which includes pickets 76 which can be secured to the bottom rail 62 by screws 82 which are received in the spline 78. Unfortunately, the use of screws necessitates the use of a cover plate to hide the screws. Thus, the mechanism of securing the parts together dictates the appearance of the system.

U.S. Pat. No. 3,506,243 to Seiler discloses a rail which is formed of two extruded rail members 12 and 13. The Seiler systems require the use of different structures for the horizontal and vertical members.

In U.S. Pat. No. 3,770,245 to Murdock, an interlocking frame construction for supporting panels of wire mesh screen, or the like, is described which can be used as fencing along roadways. The posts are rectangular tubular members which can be formed by an extrusion process. The Murdock posts are of a heavy construction and provided with anchoring means for securing the posts into concrete. The grooves 33 in the posts 12 are wedge shaped to allow for firmly locking the side portions 37. The disclosed structure is designed for extreme rigidity as it can be used to protect pedestrians from falling off overpasses, etc. The design does not provide a desired level of versatility and the locking components 39 and 41 would suffer from the same problem noted in regard to U.S. Pat. No. 4,014,520, in that the locking pressure would be directly transmitted to the outer surface of the rail.

The anodized aluminum post of Trafton, U.S. Pat. No. 4,142,343 is of a circular configuration with "a plurality of longitudinal grooves in its outer periphery" to which to attach brackets. The post, although lightweight and maintenance free, would not provide for versatility of design.

U.S. Pat. No. 3,848,844, Barrett, discloses a post having vertical grooves along its length in each of its four sides, thus forming an X type configuration when viewed from the top. The grooves are used for the attachment of shelf support brackets.

U.S. Pat. No. 3,216,170, to Deadrick discloses the use of extruded metal to form desk legs. The extruded vertical support member 44, as illustrated in FIG. 5 of the Deadrick patent is provided with channels which can accommodate removable panels 45. The disclosure, however, does show that the physical structure must accommodate screws connections does not provide the versatility required to use the system for interchangeable use with furniture, rails, partitions and the like.

Rectangular cross sectional configuration posts are well known in the prior art patents, such as for rail systems. However, the prior art systems fail to provide the desired level of versatility without a sacrifice of aesthetic quality.

SUMMARY OF THE INVENTION

It has now been found that the shortcomings of the prior art can be overcome by means of a unique structure which achieves universality of use without sacrificing structural or aesthetic requirements.

In accordance with the present invention a rail assembly is provided which includes an extruded rail support bracket having a rail receiving opening and a pair of legs. Each of the legs has a plurality of parallel locking wedge means transverse to the legs. The legs are capable of being received in a rail structure having locking wedge means at right angles to and positioned for engagement with the plurality of parallel, longitudinally extending, inwardly directed wedge shaped locking means. The assembly can also include first rail member and a second rail member, each having one end received in the rail receiving opening, and a wedge locking means. The wedge locking means has a first region force fit between an end of the first rail member and the bracket rail receiving opening and a second region force fit between one end of the second rail member and the bracket rail receiving opening. Through the force fit at least one of either the wedge locking means and/or the rail member is distorted, thereby locking the rails in said bracket. In an additional embodiment the wedge locking means is an extruded plastic member and is distorted by the force between a rail and the bracket.

BRIEF DESCRIPTION OF THE DRAWINGS

The advantages and objects of the invention will become apparent and the invention will be more fully understood from the following specification, particularly when read in conjunction with the drawings, wherein:

FIG. 1 is a fragmentary perspective view of a rail post according to the present invention;

FIG. 2 is perspective view of a rail support bracket for use with the rail post of FIG. 1;

FIG. 3 is a side view, partly in section of a rail post and a rail support bracket, with the rail post fixed to the ground by a pole which embedded in concrete;

FIG. 9 is a fragmentary side view of a hand rail cover positioned on a rail post;

FIG. 10 is a fragmentary side view of another embodiment of a hand rail cover, with the hand rail cover positioned on a rail post;

FIG. 11 is a fragmentary side view of a connecting element for joining two rail posts at an angle;

FIG. 12 is a perspective view of a base channel for supporting a rail post;

FIG. 13 is a fragmentary perspective view of a tube holder extrusion;

FIG. 14 is a fragmentary side view of a rail support bracket with a rail and a tube holder;

FIG. 15 is fragmentary side view, in section, of the rail support bracket of FIG. 14;

FIG. 16 is a fragmentary perspective view of an alternate tube holder extrusion;

FIG. 17 is a cut away side view of of a rail support bracket with a rail and alternate tube holder;

FIG. 19 is a side view of a connecting hinge, panel connection side;

FIG. 20 is a side view of a connecting hinge, post connection side;

DESCRIPTION OF THE INVENTION

Figure 4:
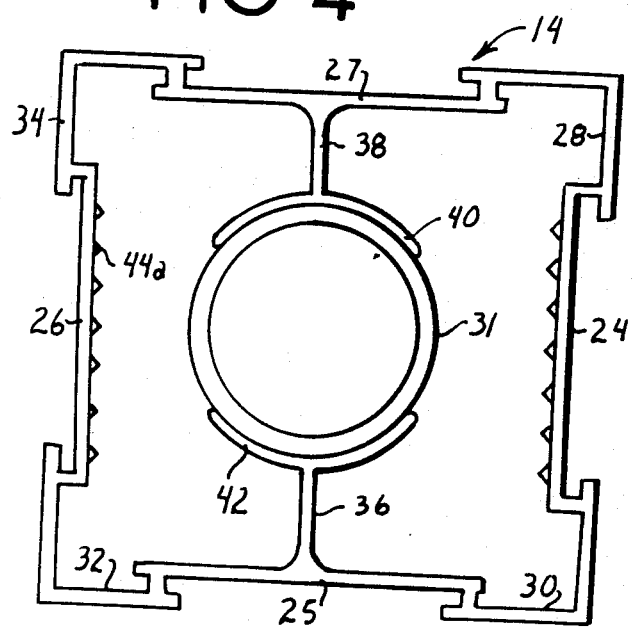
FIG. 4 is a top view of the rail post of FIG. 1 with a center support pole.

As illustrated in the embodiment of FIGS. 1 and 4, the rail post 14 can be a rectangular member, preferably a square. However, the outer circumference can be any polygon from a square to a circle. As employed herein, the term circle is a polygon of an infinite number of sides. The channel wall 25 is recessed slightly from the corner ridges 30 and 32 and is used as a decorative area. Decorative strips can be placed in the channel wall 25 to correspond to the decor of the area in which it is being used. The strips can be either a decorated treated paper with adhesive on the back or a semi rigid material which can be slipped onto the channel wall 25 and held in place by the slight overlap of the corner ridges 30 and 32.

It has been found that when internal pressure is applied to extruded aluminum it causes lighter or blemished areas in the region of the pressure. By recessing the channel wall 25 and creating a "decorative" area, the blemishes caused by the rail support bracket leg 22 are hidden by the decorative strips. The support post clamp 40 prevents movement of the rail post 14 about the support post 31, shown in FIG. 4. The support post 31 can be sunk into concrete for permanent installations or attached to a weighted base for mobile units. If the support post 31 is sunk into concrete a escutcheon plate can be used at the base to hide any visible concrete. Since the rail post 14 can be extruded in any dimension, a custom order can be dimensioned so as to cover any concrete, eliminating the need for the escutcheon plate. The use of a stationary or semistationary support post 31 allows for the decorative post unit 10 to be changed at the user's option, creating the opportunity to have holiday decor or to allow for a complete change of decor. The ridges 44 on the rail post 14 provide frictional locking between the rail support bracket 17 and the rail post 14 by interacting with the rail support ridges 50. The support post clamps 40 and 42 are spaced from the walls 25 and 27 of the rail post 14 by the support post clamp spacers 38 and 36. The spacing of the support post clamps 40, 42 from the walls provides the advantage of being able to use a smaller post for support than for decorative purposes. To use a heavy support the dimension of the rail post 14 would be a substantial unnecessary expense as well as being bulky to move. A one to two inch diameter metal post provides sufficient rigidity.

The rail support bracket 17 illustrated in FIG. 2, shows the tubular rail 19 inserted into one end of the rail guide 18 of the rail not illustrated support bracket 17. A second tubular rail would be inserted into the open end of the rail guide 18 and locked therein by use of locking means, a tubular rail holder 120 disclosed further herein. The rail support bracket, or end cap, 17 can be extruded in any desired configuration, however certain dimensions must be maintained in order to allow for the proper fit between the rail support bracket 17 and the rail post 14. The length B, the distance between the ridges 44 and their counterpart, must be slightly greater than the distance A, the space between the end cap leg 22 and end cap leg 20. The distance B can only be a fraction of an inch greater than than of distance A to allow for the friction fit previously disclosed. The space between the end cap leg 20 and end cap leg 22 must be greater than the width of the support post clamps 40, 42 to allow for clearance. In addition to the internal dimensional requirements for the friction fit between the rail support bracket 17 and the rail post 14, it is desirable that the outer dimensions of the two units be equal or, that any unequal dimensions be a desired result of design. The distance C and the distance F are at least equal so that the rail support bracket 17 sits squarely on the rail post 14, the Distance C being less than the Distance F would cause the rail support bracket 17 to be unbalanced. As stated the outer dimensions between the end cap leg 20 and end cap leg 22 must be slightly less than the space between the ridges 44 and their counterpart to allow the end cap 17 to be inserted. The spacing between the post 14 and end cap 17 must be carefully controlled as too much space between the parts allows the end cap 17 to rattle and too little space creates a difficult fit.

FIG. 3 illustrates the decorative post unit 10 in its assembled state, with the rail post 14 partially cut away to reveal the fitting of the end cap leg 22. The interlocking caused by the ridges 44 of the rail post 14 and the rail support ridges 50 is essentially the same as would be produced in the device of Walters as illustrated in FIG. 4, except that the resultant metal distortions are isolated from the exposed outer surfaces. The support post 31 of FIG. 3 is permanently embedded in a concrete base in the ground. The rail post 14 is formed of extruded aluminum of a size and length predetermined in manufacture, adhering to the critical dimensions as disclosed herein. The rail support bracket 17 can be extruded in many configurations to provide a desired aesthetic effect.

FIG. 4 illustrates the rail post 14 of FIG. 1 placed over the support post 31. The support post clamp 40 and support post clamp 42 hold the support post 31 and prevent slippage of the rail post 14.

Figure 5:
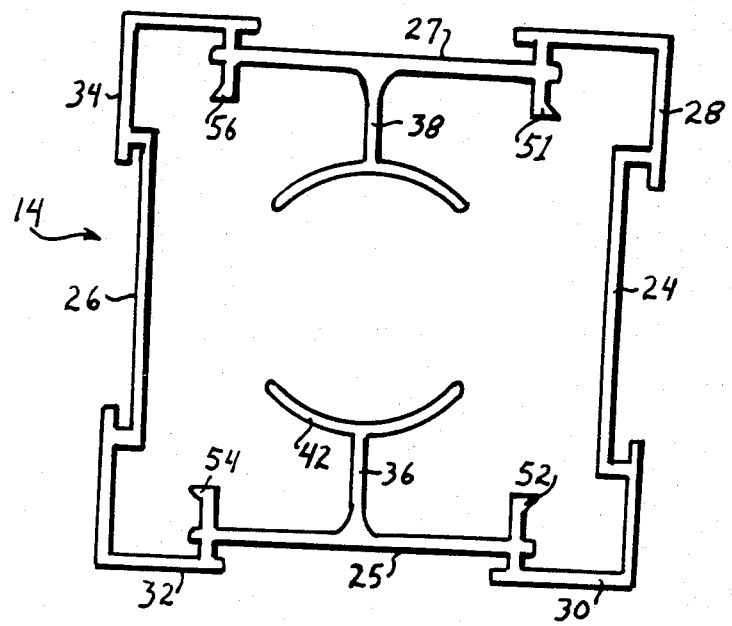
FIG. 5 is a top view of another embodiment of a rail post.

FIG. 5 illustrates an alternate rail post 14 without the ridges 44. The spacers 50, 52, 54 and 56 replace the ridges 44 and 44a and are used to lock the end cap leg 20 and end cap leg 22 in place and prevent movement of the rail support bracket 17. The positioning of the rail support ridges 50, 52, 54, and 56 have the advantage of removing the stress from an outer surface. The spaces 50, 52, 54 and 56 are placed so as to utilize the connection between the channels 25 and 27 and the corner ridges 28, 30, 32 and 34 to provide additional strength, thereby preventing any twisting of the metal while eliminating any necessity for construction changes.

Figure 6:
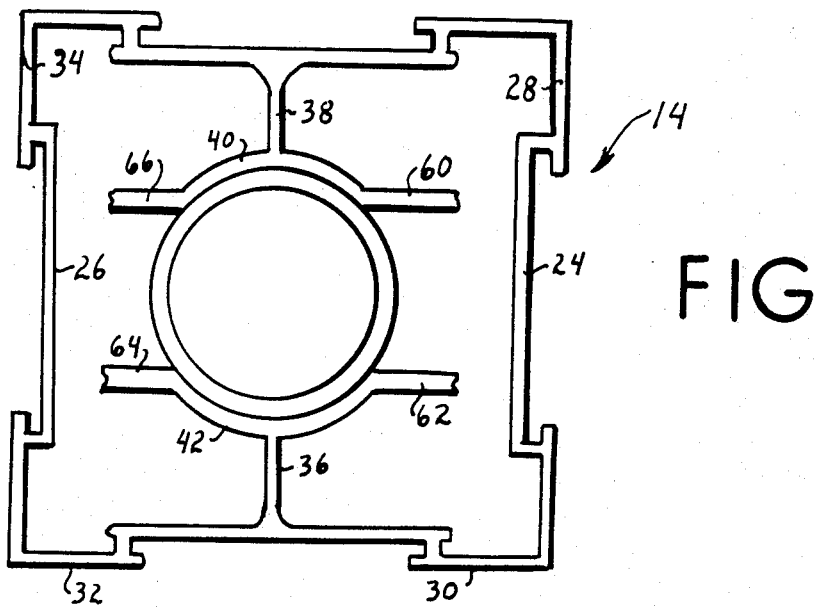
FIG. 6 is a top view of a further embodiment of a rail post.
Figure 7:
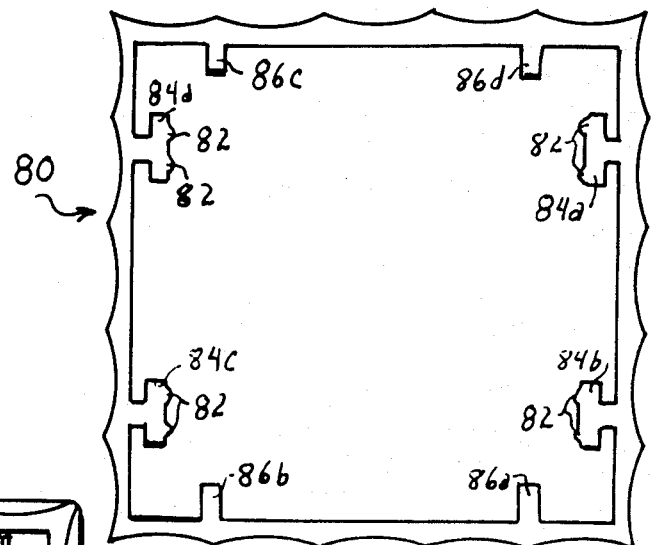
FIG. 7 is a top view of another embodiment of a rail post.
Figure 8:
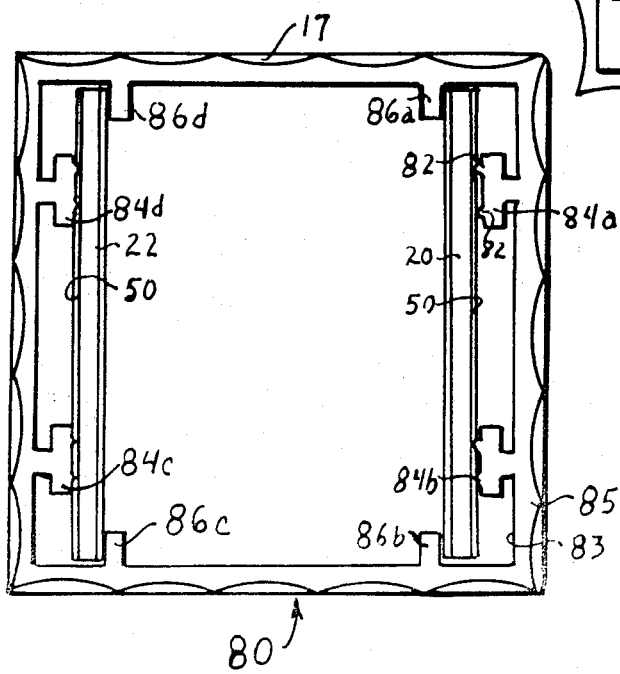
FIG. 8 is a bottom view of the rail post of FIG. 7, showing a rail support bracket in position.

Similarly, in the embodiment of FIG. 6, the locking ridges 60, 62, 64 and 66 function as in the manner of the rail support ridges 50 except to the extent that the pressure is totally to the tubular support post 31. isolated from the outer surface and is advantageously transmitted In the rail support post 80 of FIG. 7, the exterior of the post 80 is a scallop formation without the individual channel areas 24, 25, 26 and 27 of the rail post 14. The interlocking of the ridges 82 of the "T" shaped spacers 84a, 84b, 84c and 84d with the ridges 50 on the legs 20 and 22 of the end caps or rail support brackets, as shown in FIG. 8, prevent the relative movement of the rail support post 80 and the rail support bracket 17 which is inserted into its upper end. The spacers 84a, 84b, 84c and 84d must extend from the inside surface 83 of the walls 85 of the post 80 a distance such that the distance between the spacers 84a, 84b, 84c and 84d and the corresponding flanges 86a, 86b, 86c and 86d is slightly less than the thickness of the legs 20 and 22 of the bracket 17. A friction fit is thus attained.

The rail post 14 can be used in combination with a hand rail cover 90 and thus function as a hand rail. In the embodiment of FIG. 9 the hand rail cover 90 is provided with a snap fitting rail cover stop 92. The locking tab 94 of the rail cover stop 92 interlocks with the locking flange 70 of the rail post 14. The locking tab 98 similarly snaps over the locking flange 99 of the rail post 14.

In the embodiment of FIG. 10, the hand rail cover 91 has a sliding type of interlocking with the rail post 14. In this embodiment the locking leg 95 of the rail guide member 93 engages with the locking flange 71 of the rail post 14, riding in the channel formed by the locking flange 70 and the channel wall 26. Similarly, the stop 97 rests on the locking flange 71, providing rigidity.

The rail post 14 or the rail post 80 can be secured to a fixed structure or a like rail post by means of a connector mechanism. As illustrated in the embodiment of FIG. 11, the connector 111 can be an extruded symmetrical member having two mirror image sections offset at a predetermined angle. Thus, the rail post 114 is provided with a predetermined mitered end so as to be at a predetermined angle with respect to another rail post 116 which typically has a corresponding mitered end. The connector 111 locks the two rail posts 114 and 116 together by virtue of the teeth 150 of the connector legs 122 interlocking with the ridges 44 in the same manner a previously described in respect to the teeth 50 of the rail support bracket leg 22.

In another embodiment, as illustrated in FIG. 12, a connector 120 can have a "U" shaped configuration for use at the end of a rail post. A screw or bolt receiving opening 124 can be provided for securing the connector 120 to a fixed structure.

FIG. 13 illustrates a plastic connector which can be used to secure a pair of tubular rails to a rail support bracket without the use of screws or other conventionally employed devices. The connector 120 is an extruded element which can be cut into sections of about ½ inch. In use, the connector 120 is placed centrally in a rail support bracket 110 as shown in FIG. 14. A first tubular rail 106 is then inserted into the bracket 110. Movement of the connector 120 can be prevented by inserting a tool, such as a screw driver, into the tool receiving region 123 formed by the flange 121 of the connector 122. Next, the second rail 104 is inserted into the bracket 110. The upstanding flanges 126 and 125 limit the degree to which the rails can be inserted, as illustrated further in FIG. 15. As evident from FIG. 14, the wedge region 128 of the connector 120 is distorted by the rail 106. The force fit of the rail 106 into the bracket 120 causes the wedge region 128 to conform to the available space. The material of construction of the connector 120 must be rigid enough to resist deformation but must be sufficiently deformable to move under the force of the rail being inserted to the bracket. Materials of construction such as polyethylene, polypropylene and nylon can provide the required physical characteristics.

An alternate to the connector 120 is illustrated in FIG. 16. The connector 160 is manufactured from a substance which will not deform, such as heavy metals or plastic. The connector 160 is inserted into the rail post 110 and secured therein through use of tool receiving region 162, as previously described. When the rail 100 is inserted into the rail post 110 the rail 100 deforms around the connector 160, as illustrated in FIG. 17. The deformed section 102 creates a friction fit over the connector 160 securing it to the connector, as illustrated in FIG. 18.

Figure 18:
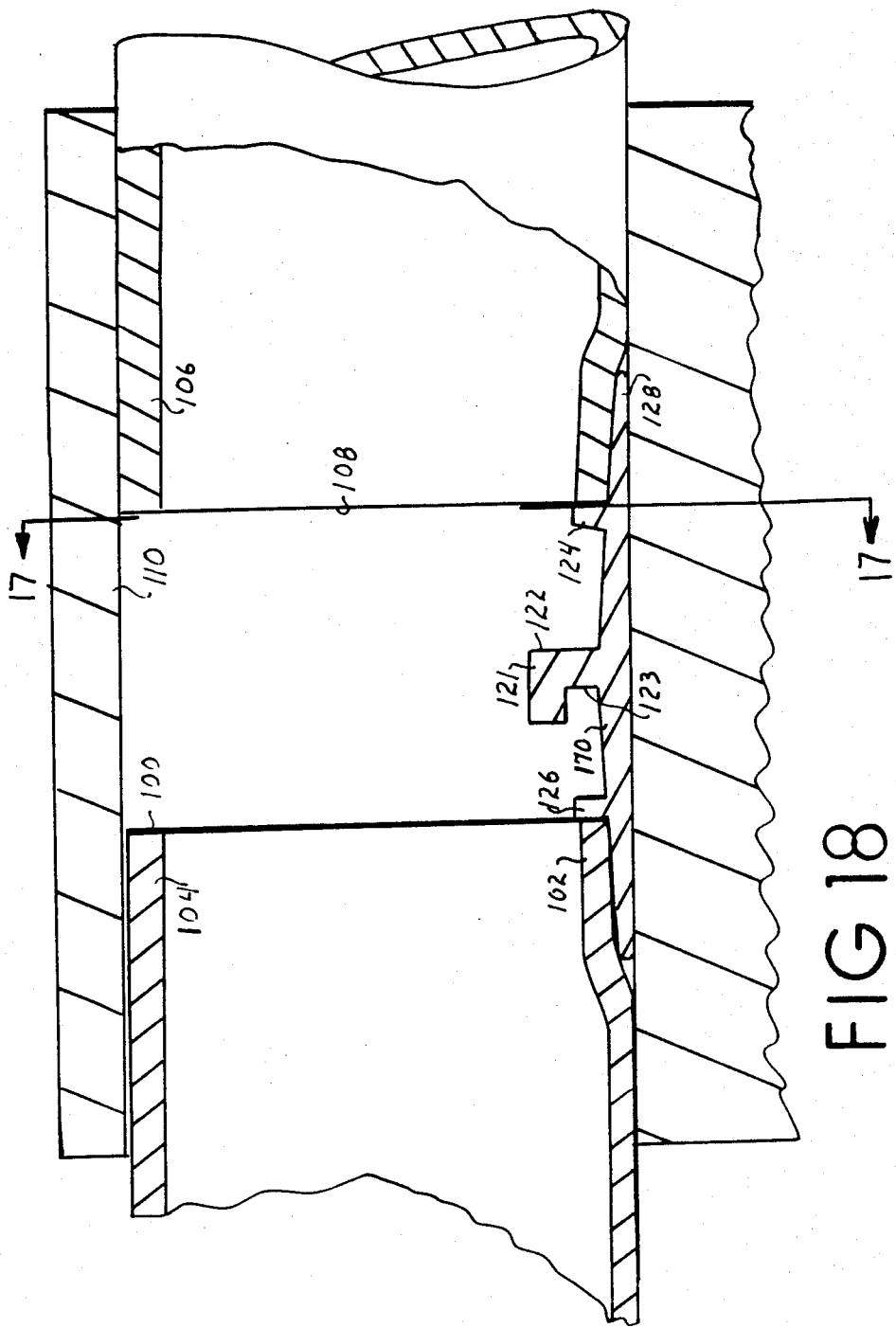
FIG. 18 is a fragmentary side view, in section of the rail support bracket and tube holder of FIG. 16.
Figure 21:
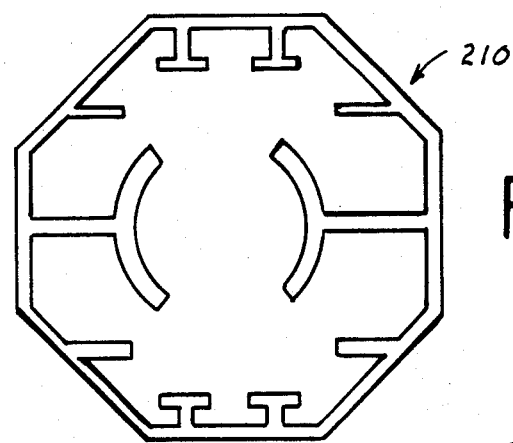
FIG. 21 is a top view of an alternate rail support post.

An additional embodiment of the connector 160 of FIG. 16 is illustrated in FIG. 18. The connector 170 has been provided with inwardly extending flanges 124 and 126 which serve to limit the extent to which the rails 106 and 104 be inserted into the rail support bracket 110.

FIG. 19 illustrates the panel side hinge member 190 of a a panel hinge assembly. Its counterpart, the post side hinge member 200 is illustrated in FIG. 20. The panel hinge members 190 and 200 are used to attach office panels, screens, etc. to the rail post 14 at an angle. A panel (not shown) is attached to the panel side member 190 by affixing the connector plate 192 to the panel, using any of the well known attachment mechanisms such as screws or adhesives. The means for affixing the panel side member 190 to the panel can be determined at time of manufacture, dependent on the construction of the panel itself. The post side member 200 is slid into the post channel 25 and blocked from falling out by the ridges 30 and 32 which lock the protrusions 202 and 204 in the post channel 25. Movement of the post side member 200 within the post channel 25 can be by prevented means of an adhesive, screws wedge means or the like. The front plate 206 can be decorated to correspond with the other channels 24, 26 and 27 of the rail post 14. The pivot arm 194 is slid down and over the hinge pin 208, thereby connecting the panel to the rail post 14. In order to permit adjustment of the angle of the panel relative to the rail post 14, the distance of the opening indicated by the arrow 196 of the pivot arm 194 must be substantially greater than the diameter of the receiving pin arm 210. It should be understood that the dimension of the opening as indicated by the arrow 196 must be small enough to prevent accidental withdrawal of the pivot pin 208 from the pivot arm 194. Alternatively, the shape of the pivot pin 208 and the corresponding shape of the pivot pin receiving region of the pivot arm can be non-circular, as for example hexagonal, so that the attachment angle relative movement is precluded. However, the degree of adjustment is limited dependent upon the shape which has been selected. The term "extruded" as employed herein is intended to describe a structure of essentially non-varying cross-section. As applied to a rail post or a rail, it means a tubular structure, without necessarily implying a circular or oval cross-section. It does, however, have an essentially non-varying cross-section along its length. An extruded post or rail is generally a slender structure, that is, it is of substantially greater length than width and a post is commonly employed vertically while a rail is commonly employed horizontally or at a slight incline to the horizon.

Figure 22:
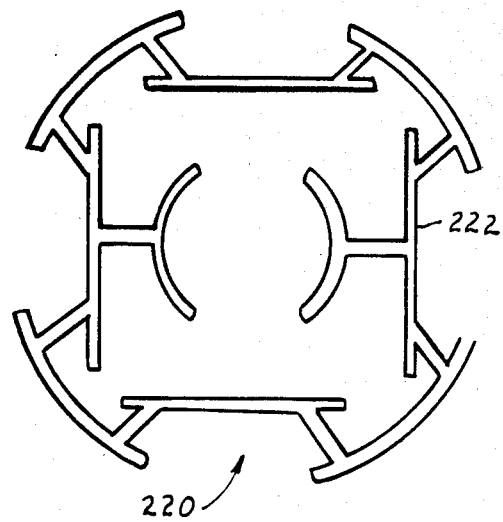
FIG. 22 is a top view of an additional alternate rail support post.
Figure 23:
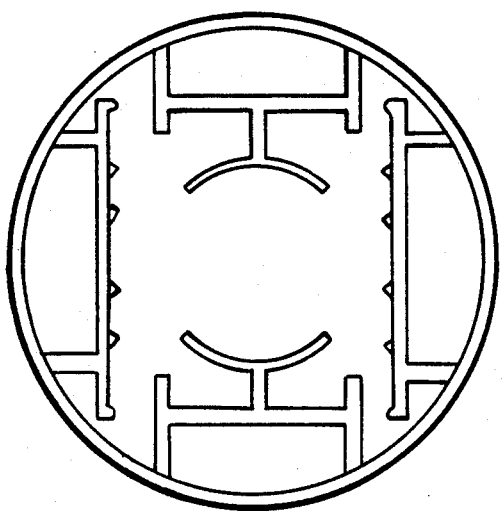
FIG. 23 is a top view of an additional rail support post.
Figure 24:
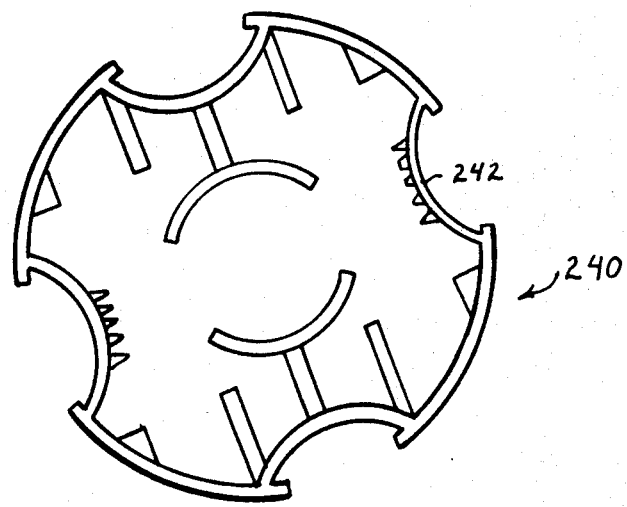
FIG. 24 is a top view of an additional raill support post.
Figure 25:
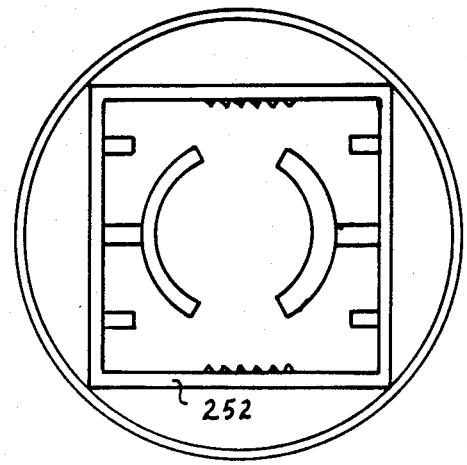
FIG. 25 is a top view of an escutcheon plate.
Figure 26:
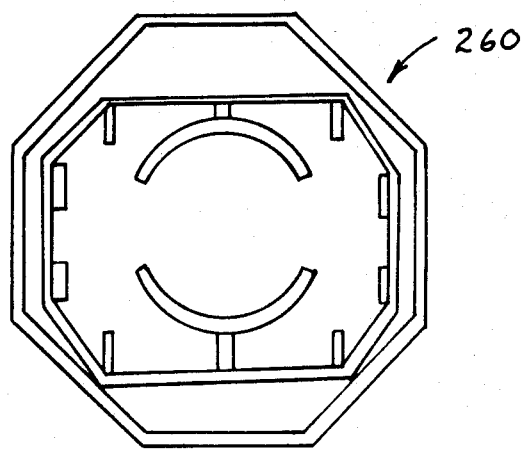
FIG. 26 is a top view of an additional escutcheon plate.

FIGS. 21, 22, 23 and 24 illustrate some of the variables which can be achieved within the scope of the instant invention. The octagonal rail support post 210 and circular rail support post 230 have no channel means and can be used as would a standard post. Although not provided with channel, rail support post 210 can be decorated with adhesive strips. FIGS. 22 and 24 are provided with channel means, 222 and 242, to allow for the decorative strips, as disclosed herein. FIGS. 25 and 26 illustrate two of the many variations of escutcheon plates to be used with the decorative posts. The escutcheon plate 260 can be used with rail support posts 220, 230 and 240, while the escutcheon plate 250 is used with rail post 14. The interior of the rail support post, as shown through the receiving area 252, is as previously described. The use of an escutcheon plate allows for the easily extruded square or rectangularly based rail support bracket 17 to be used with the non-square and non-rectangular rail posts by hiding the area not covered by the rail support bracket. The escutcheon plate can be extruded or made from any procedure known in the art, and colored to correspond to the rail structure.

The designs illustrated herein for both the base and end caps are used as examples and should in no way be considered to limit the scope of the invention. The extrusion dies can be produced in any number of desired shapes providing almost limitless combinations.

What is claimed is:

1. A rail structure, said rail structure comprising:
   a polygonal extruded member,
   at least a pair of inwardly extending locking means extending from opposing walls of said extruded member,
   a plurality of parallel, longitudinally extending, inwardly directed wedge shaped locking means on each of said inwardly extending locking means,
   further comprising a rail support bracket, said rail support bracket being an extruded member having a rail receiving opening and a pair of legs, each of said legs having a plurality of parallel locking wedge means, said locking wedge means being transverse to said legs, said legs being received in said rail structure with said locking wedge means being at right angles to and in engagement with said plurality of parallel, longitudinally extending, inwardly directed wedge shaped locking means of said inwardly extending locking means.

2. The structure of claim 1, wherein each of said locking wedge means has an inclined side and a noninclined side whereby said locking wedge means during insertion is in sliding engagement with said rail wedge shaped locking means and during removal is in locking engagement with said rail wedge shaped locking means.

3. The structure of claim 2, further comprising at least a pair of inwardly extending flange means extending from opposing walls of said extruded member, a pair of pipe locking means, each of said pair of pipe locking means being spaced from a wall of said extruded member by one of said flange means.

4. The structure of claim 3, wherein said pipe locking means is an arcuate member.

5. A rail structure, said rail structure comprising: an open ended extruded polygonal member, said polygonal member having an interior and an exterior and at least four sides, a plurality of parallel, longitudinally extending, inwardly directed wedge shaped locking means and at least one channel means;
   said channel means running longitudinally along said polygonal member and being substantially parallel to the sides of said rail structure,
   said channel having two sustantially flat wall portions and a substantially flat base portion,
   said flat wall portions of said channel being at right angles to said rail structure wall and to said channel base portion,
   wherein said sides of said rail structure extend beyond said flat wall portions of said channel forming flanges, said flanges being parallel with said channel base portion, and a rail support bracket;
   said rail support bracket being an extruded member having a rail receiving opening an a pair of legs, each of said legs having a plurality of parallel locking wedge means, said locking wedge means being transverse to said legs, said legs being received in said rail structure with locking wedge means and being at right angles to and in engagement with said plurality of parallel, longitudinally extending, inwardly directed wedge shaped locking means.

6. An open ended polygonal extruded rail member, at least a pair of inwardly extending flange means, each of said pair of inwardly extending flange means extending essentially normally from opposing walls of said extruded member, a pair of pipe locking means, each of said pair of pipe locking means being arcuate members and being affixed to an end of a flange means and thereby being spaced from a wall of said extruded member by one of said flange means.

7. The structure of claim 6, further comprising a support post, said support post being positioned within said pipe locking means in a clamping arrangement whereby the pipe locking means prevents movement of said polygonal extruded member about said support post.

* * * * *